(12) United States Patent
Do et al.

(10) Patent No.: US 8,027,003 B2
(45) Date of Patent: Sep. 27, 2011

(54) LIQUID CRYSTAL DISPLAY

(75) Inventors: Hee-Wook Do, Cheonan-si (KR);
Ki-Chul Shin, Seongnam-si (KR);
Sung-Min Kang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 180 days.

(21) Appl. No.: 12/368,172

(22) Filed: Feb. 9, 2009

(65) Prior Publication Data

US 2009/0310069 A1   Dec. 17, 2009

(30) Foreign Application Priority Data

Jun. 12, 2008   (KR) ................ 10-2008-0055192

(51) Int. Cl.
*G02F 1/1335*   (2006.01)
(52) U.S. Cl. .................... 349/118; 349/96; 349/107
(58) Field of Classification Search .............. 349/96–98, 349/106–109, 117–119
See application file for complete search history.

(56) References Cited

U.S. PATENT DOCUMENTS

| 6,157,425 | A   | 12/2000 | Kuo et al. |
| 7,379,141 | B2* | 5/2008  | Moriya ........................ 349/119 |
| 2005/0062917 | A1 | 3/2005 | Kashima |
| 2006/0139274 | A1 | 6/2006 | Song et al. |
| 2007/0076144 | A1 | 4/2007 | Okita et al. |
| 2007/0076152 | A1 | 4/2007 | Ito et al. |
| 2007/0177085 | A1 | 8/2007 | Nishiyama et al. |

FOREIGN PATENT DOCUMENTS

| JP | 2006-091083 | 4/2006 |
| KR | 10-0435127  | 5/2004 |
| WO | 2006093358 A1 | 9/2006 |

OTHER PUBLICATIONS

European Search Report dated Oct. 13, 2009.

* cited by examiner

*Primary Examiner* — Dung T. Nguyen
(74) *Attorney, Agent, or Firm* — Innovation Counsel LLP

(57) ABSTRACT

A liquid crystal display includes a lower panel, an upper panel facing the lower panel and including a plurality of red color filters, green color filters, and blue color filters, and a liquid crystal layer interposed between the lower and upper panels. The liquid crystal layer has first, second and third cell-gap portions corresponding to the red, green and blue filters, respectively, and the first second and third cell-gap portions have cell gaps Dr, Dg and Db, respectively. A first compensation film is disposed on an outer surface of one of the lower panel or the upper panel. A lower polarizer is on the outer surface of the lower panel and an upper polarizer is on the outer surface of the upper panel. The cell gaps Dr, Dg and Db may satisfy the equation $0\,\mu m \leqq Dg-Db$ and $Dr-Dg \leqq 0.5\,\mu m$.

27 Claims, 9 Drawing Sheets

LIQUID CRYSTAL DISPLAY

CROSS-REFERENCE TO RELATED APPLICATION

This application claims priority to and all of the benefits accruing from the Korean Patent Application No. 10-2008-0055192 filed in the Korean Intellectual Property Office on Jun. 12, 2008, the entire contents of which are incorporated herein by reference.

BACKGROUND OF THE DISCLOSURE (a) Field of the Invention

The present invention relates to a liquid crystal display.

(b) Description of the Related Art

A liquid crystal display (LCD) is one of the most widely used flat panel displays (FPD). An LCD has two display panels on which field generating electrodes are formed with a liquid crystal layer interposed between the two display panels. A voltage is applied to the field generating electrodes to generate an electric field on the liquid crystal layer. The generated electric field determines the orientation of liquid crystal molecules of the liquid crystal layer and controls the polarization of incident light to display an image.

The liquid crystal layer is classified into various types according to the type of arrangement of the liquid crystal molecules. For example, there may be a twisted nematic (TN) mode, a vertical alignment (VA) mode, an in-plane switching (IPS) mode, etc.

In the twisted nematic mode, the long axes of liquid crystal molecules are arranged parallel to the substrate in the absence of an electric field and arranged perpendicular to the substrate by the electric field. When the liquid crystal molecules are aligned parallel to the substrate, the liquid crystal molecules are in a twisted state.

On the other hand, in a vertical alignment (VA) mode LCD, unlike the twisted nematic mode, the long axes of the liquid crystal molecules are arranged perpendicular to the substrate in the absence of the electric field and arranged perpendicular to the direction of the electric field when the electric field is applied.

In the in-plane switching mode LCD, two field generating electrodes are formed on one substrate, whereby an electric field may include directions different from the perpendicular or horizontal direction.

Among them, in an LCD of the vertical alignment (VA) mode or the nematic mode, as light polarized by a polarizer passes through the liquid crystal layer having optical anisotropy, the phase retardations differ according to the incident angle of the light such that a difference of the phase retardation is generated, thereby differentiating the transmittance according to the viewing angle.

Accordingly, a compensation film to compensate the difference of the phase retardation is used in the liquid crystal layer, thereby improving the viewing angle.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In an exemplary embodiment, a liquid crystal display includes a lower panel, an upper panel facing the lower panel and including a plurality of red color filters, green color filters, and blue color filters, and a liquid crystal layer interposed between the lower and upper panels. The liquid crystal layer has first, second and third cell-gap portions corresponding to the red, green and blue filters, respectively, and the first, second and third cell-gap portions have cell gaps Dr, Dg and Db, respectively. A first compensation film is disposed on an outer surface of one of the lower panel or the upper panel. A lower polarizer is on the outer surface of the lower panel and an upper polarizer is on the outer surface of the upper panel. The cell gaps Dr, Dg and Db satisfy the equation $0\ \mu m \leq Dg-Db$ and $Dr-Dg \leq 0.5\ \mu m$.

The first compensation film may comprise a negative C-plate or a negative biaxial film.

A second compensation film may be disposed on the outer surface of the upper or lower panels facing the first compensation film.

The second compensation film may include a positive A-plate.

The red, green and blue color filters may each have a corresponding wavelength, $\lambda r$, $\lambda g$, and $\lambda b$ corresponding to red, green and blue, respectively. The first, second and third cell-gap portions may have corresponding phase retardation values $Rthl\_r$, $Rthl\_g$, and $Rthl\_b$ in a thickness direction of the liquid crystal layer and corresponding toe the wavelengths $\lambda r$, $\lambda g$, and $\lambda b$ of red, green and blue, respectively. The first compensation film may have phase retardation values $Rth\_r$, $Rth\_g$, and $Rth\_b$ in a thickness direction and corresponding to the wavelengths $\lambda r$, $\lambda g$, and $\lambda b$ of red, green and blue, respectively. The phase retardation values and wavelengths may satisfy the equation $$0.21 \leq \frac{Rthl\_r - Rth\_r}{\lambda r} = \frac{Rthl\_g - Rth\_g}{\lambda g} = \frac{Rthl\_b - Rth\_b}{\lambda b} \leq 0.24.$$

The liquid crystal layer may have different cell gaps according to positions corresponding to the red, green, and blue color filters.

Cell gaps of the liquid crystal layer corresponding to the red, green, and blue color filters may decrease in that order.

Thicknesses of the red, green, and blue color filters may be different from each other.

Thicknesses of the red, green, and blue color filters may increase going from the red to the green and to the blue color filters, in that order.

The lower or the upper panel may include an insulating layer, and a thickness of the insulating layer may differ according to positions corresponding to the red, green, and blue color filters.

The thickness of the insulating layer may corresponding to the red, green, and blue color filters may increase in that order.

The lower panel further may comprise a pixel electrode, and a thickness of the pixel electrode may differ according to the positions corresponding to the red, green, and blue color filters.

The thickness of the pixel electrode corresponding to the red, green, and blue color filters may increase in that order.

The liquid crystal layer may comprise different liquid crystal molecules according to positions corresponding to the red, green, and blue color filters.

The liquid crystal layer may be divided by a partition.

The liquid crystal layer may include liquid crystal molecules, long axes of the liquid crystal molecules may be arranged perpendicular to the lower and upper panels, and transmissive axes of the lower and upper polarizers may be perpendicular to each other.

In an exemplary embodiment, a liquid crystal display includes a lower panel, an upper panel facing the lower panel and a plurality of red color filters, green color filters, and blue color filters. A liquid crystal layer is interposed between the lower and upper panels. A first compensation film is on the outer surface of the lower panel or the upper panel. A lower polarizer is disposed on the outer surface of the lower panel, and an upper polarizer is on the outer surface of the upper panel. The lower or upper panel further comprises a phase retardation layer. The wavelengths and phase retardation values may satisfy:

$$0.21 \leq \frac{Rthl\_r + Rthp\_r - Rth\_r}{\lambda r} = \frac{Rthl\_g + Rthp\_g - Rth\_g}{\lambda g} = \frac{Rthl\_b + Rthp\_g - Rth\_b}{\lambda b} \leq 0.24$$

where, $\lambda r$, $\lambda g$, and $\lambda b$ are wavelengths of red, green, and blue colors respectively, $Rthl\_r$, $Rthl\_g$, and $Rthl\_b$ are phase retardation values of the liquid crystal layer in a thickness direction for the wavelengths of red, green, and blue respectively, $Rthp\_r$, $Rthp\_g$, and $Rthp\_b$ are phase retardation values of the phase retardation layer in a thickness direction for the wavelengths of red, green, and blue respectively, and $Rth\_r$, $Rth\_g$, and $Rth\_b$ are phase retardation values of the compensation film in a thickness direction for the wavelengths of red, green, and blue respectively.

The first compensation film may comprise a negative C-plate or a negative biaxial film.

A second compensation film disposed on the outer surface of the upper or lower panels facing the first compensation film may be included.

The second compensation film may have a positive A-plate.

The liquid crystal layer may have liquid crystal molecules, wherein long axes of the liquid crystal molecules are arranged perpendicular to the lower and upper panels, and transmissive axes of the lower and upper polarizers are perpendicular to each other.

In an exemplary embodiment, a liquid crystal display includes a lower panel, an upper panel facing the lower panel, and a plurality of red color filters, green color filters, and blue color filters. A liquid crystal layer is interposed between the lower and upper panels; a first compensation film is on an outer surface of one of the lower panel or the upper panel; a lower polarizer disposed on the outer surface of the lower panel; and an upper polarizer on the outer surface of the upper panel. Phase retardation values of the thickness direction of the red, green, and blue color filters are different, and satisfy:

$$0.21 \leq \frac{Rthl\_r + Rthc\_r - Rth\_r}{\lambda r} = \frac{Rthl\_g + Rthc\_g - Rth\_g}{\lambda g} = \frac{Rthl\_b + Rthc\_g - Rth\_b}{\lambda b} \leq 0.24$$

where, $\lambda r$, $\lambda g$, and $\lambda b$ are wavelengths of red, green and blue respectively, $Rthl\_r$, $Rthl\_g$, and $Rthl\_b$ are phase retardation values of the liquid crystal layer in a thickness direction of the liquid crystal layer for the wavelengths of red, green, and blue respectively, $Rthc\_r$, $Rthc\_g$, and $Rthc\_b$ are phase retardation values of the red, green, and blue color filters in a thickness direction of the red, green, and blue color filters for the wavelengths of red, green, and blue, and $Rth\_r$, $Rth\_g$, and $Rth\_b$ are phase retardation values of the first compensation film in a thickness direction for the wavelengths of red, green, and blue.

The first compensation film may have a negative C-plate or a negative biaxial film.

A second compensation film disposed on the outer surface of the upper or lower panels facing the first compensation film may be included.

The second compensation film may have a positive A-plate.

The liquid crystal layer may have liquid crystal molecules, wherein long axes of the liquid crystal molecules are arranged perpendicular to the lower and upper panels, and transmissive axes of the lower and upper polarizers are perpendicular to each other.

In an exemplary embodiment, a liquid crystal display includes a lower panel, an upper panel facing the lower panel and including a plurality of red color filters, green color filters, and blue color filters, a liquid crystal layer interposed between the lower and upper panels, a first compensation film on an outer surface of the lower panel or the upper panel, a lower polarizer disposed on the outer surface of the lower panel, and an upper polarizer on the outer surface of the upper panel. The wavelengths of the filters and phase retardation values of the lower panel, the liquid crystal layer, and the lower and upper polarizer satisfy:

$$0.21 \leq \frac{Rth\_r - Rthc\_r}{\lambda r} = \frac{Rth\_g - Rthc\_g}{\lambda g} = \frac{Rth\_b - Rthc\_b}{\lambda b} \leq 0.24$$

where, $\lambda r$, $\lambda g$, and $\lambda b$ respectively are wavelengths of red, green, and blue, $Rth\_r$, $Rth\_g$, and $Rth\_b$ are phase retardation values of the lower panel, the liquid crystal layer, the lower and upper polarizer, and the upper panel in a thickness direction thereof for the wavelengths of red, green, and blue respectively, and $Rthc\_r$, $Rthc\_g$, and $Rthc\_b$ are phase retardation values of the first compensation film in a thickness direction of the first compensation film for the wavelengths of red, green and blue respectively.

A second compensation film may be disposed on the outer surface of the upper or lower panels facing the first compensation film.

DETAILED DESCRIPTION OF THE EMBODIMENTS

Figure 1:
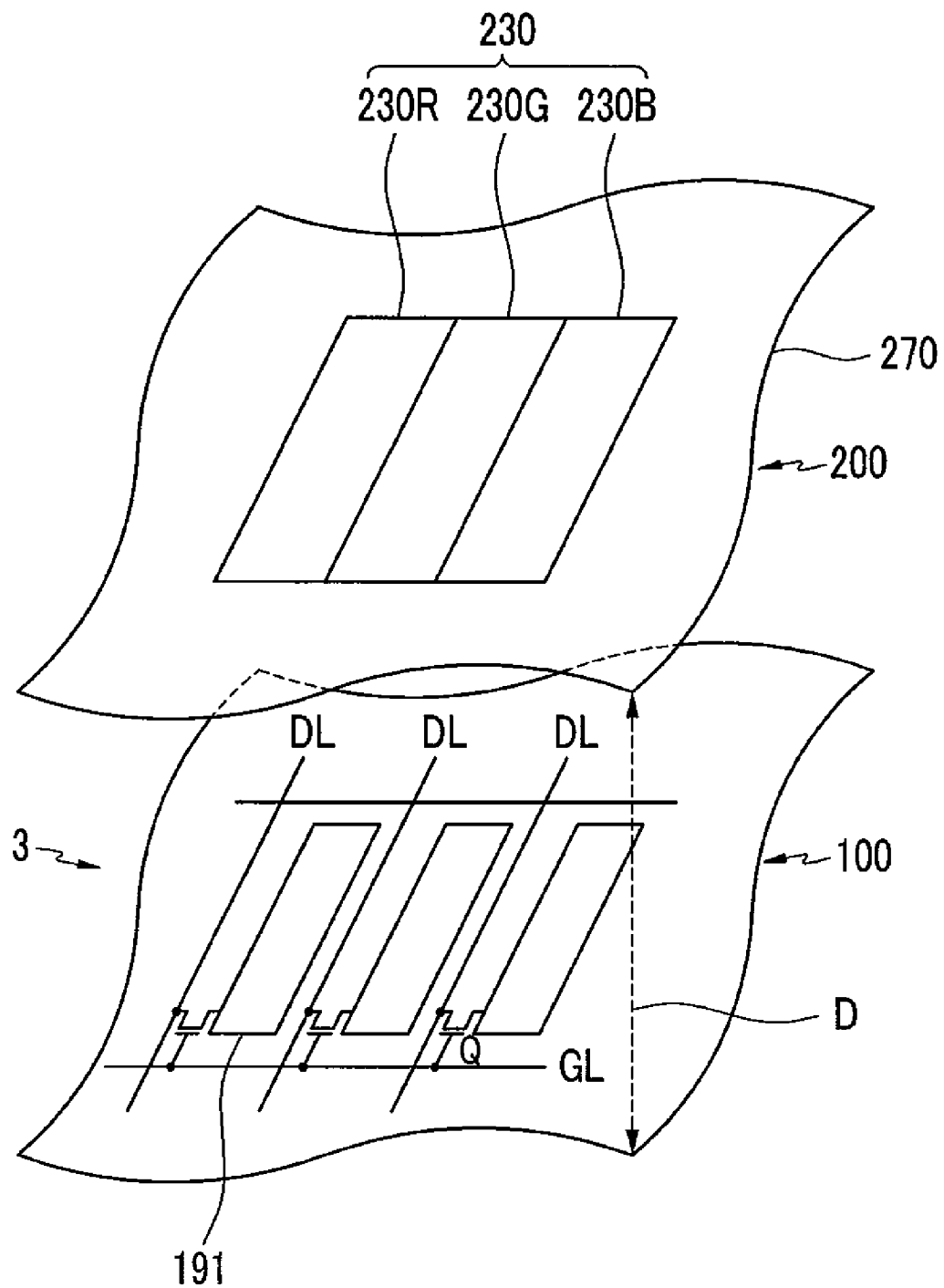
FIG. 1 illustrates an exemplary embodiment of an equivalent circuit diagram for three pixels in a liquid crystal display.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, a liquid crystal display according to an exemplary embodiment of the present invention will be described with reference to FIG. 1.

FIG. 1 illustrates an exemplary embodiment of an equivalent circuit diagram for three pixels in a liquid crystal display. In an exemplary embodiment, a liquid crystal panel assembly may include a lower panel 100 and an upper panel 200 facing each other, with a liquid crystal layer 3 interposed therebetween.

The lower panel 100 is provided with signal lines including a plurality of gate lines GL and a plurality of data lines DL. A plurality of switching transistors Q are connected to the gate lines GL and the data lines DL, and a plurality of pixel electrodes 191 are connected thereto.

The gate lines GL are for transmitting gate signals (also called "scanning signals") and extend substantially in a row direction and are parallel to each other.

The data lines DL are for transmitting data signals and extend in a column direction, thereby intersecting the gate lines GL, and are parallel to each other.

The switching element Q is a three terminal element such as a thin film transistor, the control terminal of which is connected to the gate line GL, the input terminal of which is connected to the data line DL, and the output terminal of which is connected to the pixel electrode 191.

The pixel electrodes 191 are supplied with data voltages from the data lines DL through the switching elements Q.

A common electrode 270 and color filters 230 including a red color filter 230R, a green color filter 230G, and a blue color filter 230B are formed in the upper panel 200.

The common electrode 270 may be formed on the surface of the upper panel 200, for example on the whole surface, and may be applied with a common voltage Vcom. In an alternative embodiment, the common electrode 270 may be formed on the lower panel 100, wherein at least one of the two electrodes 191 and 270 may have a linear shape or a bar shape.

In an exemplary embodiment, each of the color filters 230R, 230G, and 230B may be disposed on a region of the upper panel 200 corresponding to the pixel electrode 191 and may represent one of the primary colors. An exemplary embodiment, a set of the primary colors may include red, green, and blue colors. For a color display, one pixel PX including a color filter 230R, 230G, or 230B uniquely represents one of the primary colors (i.e., spatial division) or each pixel PX sequentially represents the primary colors in turn (i.e., temporal division), so that a spatial or temporal sum of the primary colors is recognized as a desired color. FIG. 1 shows an exemplary embodiment with spatial division. In alternative embodiments, the color filters 230 may be provided on or under the pixel electrodes 191 on the lower panel 100.

The liquid crystal layer 3 may have negative or positive dielectric anisotropy and may maintain a uniform cell gap D. The liquid crystal molecules of the liquid crystal layer 3 may be arranged so that their longitudinal axes are perpendicular or parallel to the surfaces of the two panels in the absence of an electric field.

In an exemplary embodiment, at least one polarizer (not shown) is provided on the outer surfaces of the display panels 100 and 200 for polarizing light.

If a gate-on voltage is applied to the gate line GL, the thin film transistor Q connected thereto is turned on, and the data voltages applied to the data line DL are transmitted to the pixel electrode 191 through the turned-on thin film transistor Q. When the data voltage is applied, the pixel electrode 191 forms an electric field along with the common electrode 270, with the common voltage applied, thereby determining the directions of the liquid crystal molecules in the liquid crystal layer 3 between the two electrodes 191 and 270. Accordingly, the polarization of the light passing through the liquid crystal layer 3 is changed according to the determined directions of the liquid crystal molecules, and this change of the polarization appears as a change of the transmittance by the polarizer, thereby displaying images.

Figure 2:
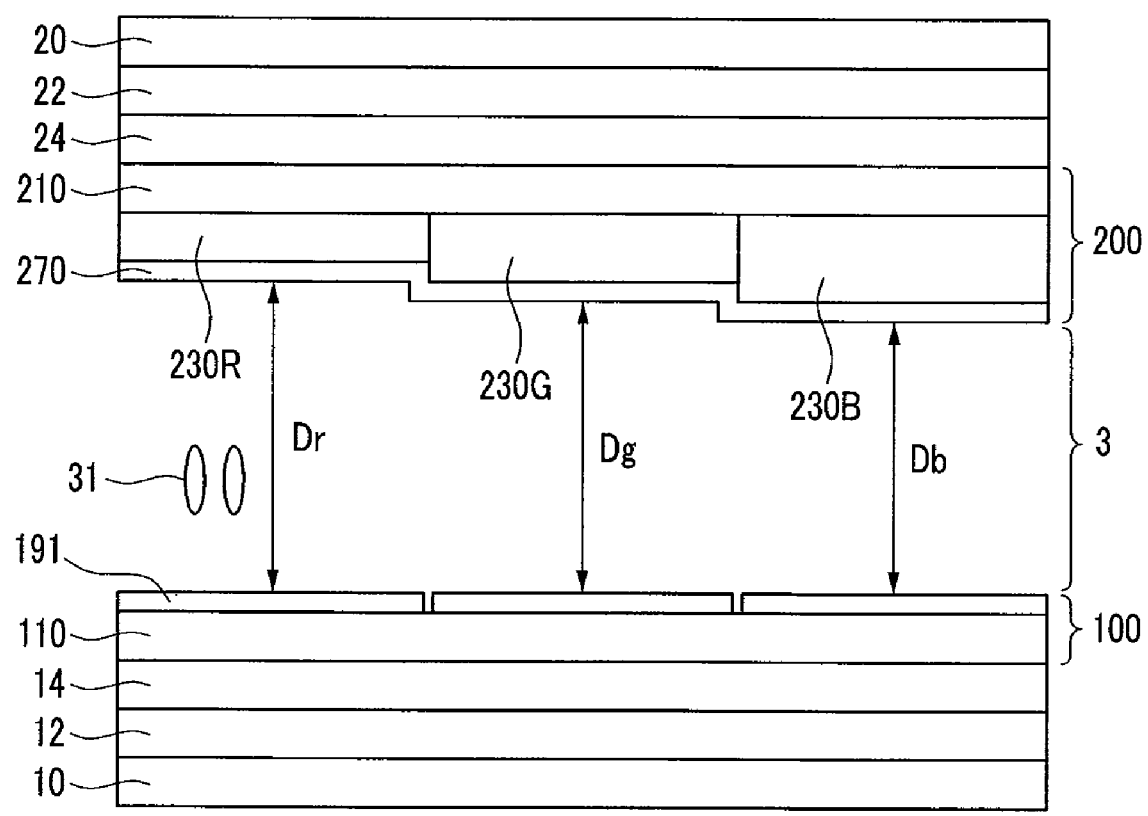
FIG. 2 is a schematic cross-sectional view of an exemplary embodiment of a liquid crystal display.

FIG. 2 is a schematic cross-sectional view of an exemplary embodiment of a liquid crystal display. A liquid crystal panel assembly may include a lower panel 100 and an upper panel 200 facing each other, and a liquid crystal layer 3 interposed therebetween.

First, referring to the lower panel 100, a plurality of pixel electrodes 191 are formed on a lower substrate 110. The lower substrate may be made, for example, of transparent glass or plastic. The pixel electrodes 191 may be made of a transparent conductive material such as ITO or IZO, or a reflective metal such as aluminum, silver, chromium, or alloys thereof.

A plurality of switching elements (not shown), such as a thin film transistor for transmitting data voltages to the pixel electrodes 191, may be formed between the lower substrate 110 and the pixel electrodes 191. A passivation layer (not shown), for example one made of an inorganic insulator or an organic insulator, may be further added between the switching elements (not shown) and the pixel electrodes 191.

Next, referring to the upper panel 100, a plurality of red color filters 230R, green color filters 230G, and blue color filters 230B may be formed on an upper substrate 210. The upper substrate may be made, for example, of transparent glass or plastic.

The color filters 230R, 230G, and 230B may have different thicknesses, and the thicknesses thereof may become greater gradually according to the sequence of the red color filter 230R, the green color filter 230G, and the blue color filter 230B.

A common electrode 270 is formed on the color filters 230R, 230G, and 230B, and the common electrode 270 may be made of a transparent conductor such as ITO or IZO.

An overcoat (not shown) may be further added between the color filters 230 and the common electrode 270, and may be made of an insulating material such as an organic material.

The liquid crystal layer 3 interposed between the lower panel 100 and the upper panel 200 may include liquid crystal molecules 31 having negative dielectric anisotropy. The long axes of the liquid crystal molecules may be arranged perpendicular to the surfaces of the display panels 100 and 200 in the absence of an electric field. A refractive index Nzl of the liquid crystal molecules 31 in a direction of the long axis thereof and refractive indexes Nxl and Nyl in the directions perpendicular to the z direction, which is the direction of the long axis, satisfy Equation 1 as follows.

$$Nxl = Nyl < Nzl \qquad \text{(Equation 1)}$$

On the other hand, cell gaps D of the liquid crystal layer 3 differ according to the positions of the color filters 230R, 230G, and 230B. The cell gap Dr of the liquid crystal layer 3 disposed on the red color filter 230R, the cell gap Dg of the liquid crystal layer 3 disposed on the green color filter 230G, and the cell gap Db of the liquid crystal layer 3 disposed on the blue color filter 230B decrease in that order as the thicknesses of the color filters 230R, 230G, and 230B increase. On the other hand, the cell gaps Dr, Dg, and Db may satisfy 0 μm≦Dg−Db and Dr−Dg≦0.5 μm.

The phase retardation values in the direction of the cell gap D of the liquid crystal layer 3 disposed on each of the color filters 230R, 230G, and 230B are obtained by Equation 2.

$$Rthl = \left(\frac{Nxl + Nyl}{2} - Nzl\right) \times D \quad \text{(Equation 2)}$$

Here, the values of the refractive indexes Nxl, Nyl, and Nzl of the liquid crystal layer 3 depend on the wavelengths λr, λg, and λb of red R, green G, and blue B light, respectively, so that the phase retardation values Rthl in the direction of the cell gap D for the respective wavelengths λr, λg, and λb are different from each other.

In an exemplary embodiment, alignment layers (not shown), to align the liquid crystal layer 3, may be coated on the inner surface of the display panels 100 and 200 such that the alignment directions of the liquid crystal molecules 31 may be controlled.

On the other hand, lower and upper compensation films 14 and 24, lower and upper polarizers 12 and 22, and lower and upper supporters 10 and 20 are provided on the outer surface of the lower substrate 110 and the upper substrate 210, respectively.

The lower and upper supporters 10 and 20 may have good water-resistance, pressure-resistance, and heat-resistance characteristics, in order to help protect the polarizers 12 and 22 from external influences. In an alternative embodiment, the lower and upper supporters 10 and 20 may be disposed on or under the polarizer 12 and 22, unlike the embodiment illustrated in FIG. 2. The supporters 10 and 20 may include tri-acetyl-cellulose (TAC) or cellulous acetate propionate (CAP).

The lower and upper polarizers 12 and 22 may each have a respective transmissive axis arranged to pass polarized light in a specific direction. In an exemplary embodiment, the transmissive axis of the upper polarizer 22 may be perpendicular to the transmissive axis of the lower polarizer 12.

In an exemplary embodiment, the lower compensation film 14 may compensate the phase retardation values Rthl of the liquid crystal layer 3 in a direction of the cell gap thereof according to viewing angles, and may comprise a negative C-plate or a biaxial film having a specific phase retardation value Rthl in a thickness direction. "Thickness direction," as used herein, refers to a direction that is orthogonal to the surface of the supporter 10 on which layers are formed. The refractive indexes Nx, Ny, and Nz of a negative C-plate may satisfy Equation 3, and the refractive indexes Nx, Ny, and Nz of a biaxial film may satisfy Equation 4 as follows.

$$Nx = Ny > Nz \quad \text{(Equation 3)}$$

$$Nx \neq Ny > Nz \quad \text{(Equation 4)}$$

Here, the refractive index Nz is a refractive index of the lower compensation film 14 in a thickness direction, and the refractive indexes Nx and Ny are refractive indexes of the compensation film 14 in a planar direction perpendicular to the thickness direction.

The phase retardation value Rth in a thickness direction of the lower compensation film 14 may be obtained by Equation 5 below.

$$Rth = \left(\frac{Nx + Ny}{2} - Nz\right) \times d \quad \text{(Equation 5)}$$

Here, d is the thickness of the lower compensation film 14. The refractive indexes Nx, Ny, and Nz of the lower compensation film 14 may also depend on the wavelengths λr, λg, and λb of light, so that the phase retardation value Rth in a thickness direction differ according to the wavelengths λr, λg, and λb.

The upper compensation film 24 generally compensates the planar phase retardation Rol in the liquid crystal layer 3, and may use a positive A-plate of which the refractive indexes Nx, Ny, and Nz satisfy Equation 6.

$$Nx > Ny = Nz \quad \text{(Equation 6)}$$

The phase retardation value Ro in a planar direction of the upper compensation film 24 may be obtained by Equation 7.

$$Ro = (Nx - Ny) \times d \quad \text{(Equation 7)}$$

Here, d is the thickness of the upper compensation film 24.

The lower compensation film 14 and the upper compensation film 24 may be exchanged with each other.

In the present exemplary embodiment, the phase retardation values Rthl_r, Rthl_g, and Rthl_b of the liquid crystal layer 3 in the direction of the cell gaps Dr, Dg, and Db and the phase retardation values Rth_r, Rth_g, and Rth_b of the lower compensation film 14 in the thickness direction according to wavelengths λr, λg, and λb of the primary colors R, G, and B satisfy Equation 8.

$$0.21 \leq \frac{Rthl\_r - Rth\_r}{\lambda r} = \frac{Rthl\_g - Rth\_g}{\lambda g} = \frac{Rthl\_b - Rth\_b}{\lambda b} \leq 0.24 \quad \text{(Equation 8)}$$

Here, the Rth_r, Rth_g, and Rth_b are the phase retardation values of the lower compensation film 14 in the thickness direction according to the wavelengths λr, λg, and λb of the red R, the green G, and the blue B by Equation 4. Also, Rthl_r, Rthl_g, and Rthl_b are phase retardation values of the liquid crystal layer 3 in the direction of the cell gaps Dr, Dg, and Db for the respective wavelengths λr, λg, and λb that are obtained from Equation 2 by inserting the cell gaps Dr, Dg, and Db thereto.

The phase retardation values Rthl_r, Rthl_g, and Rthl_b may be phase retardation values for all layers of the polarizers 12 and 22, the supporters 10 and 20, and the display panels 100 and 200 as well as the liquid crystal layer 3.

Figure 3:
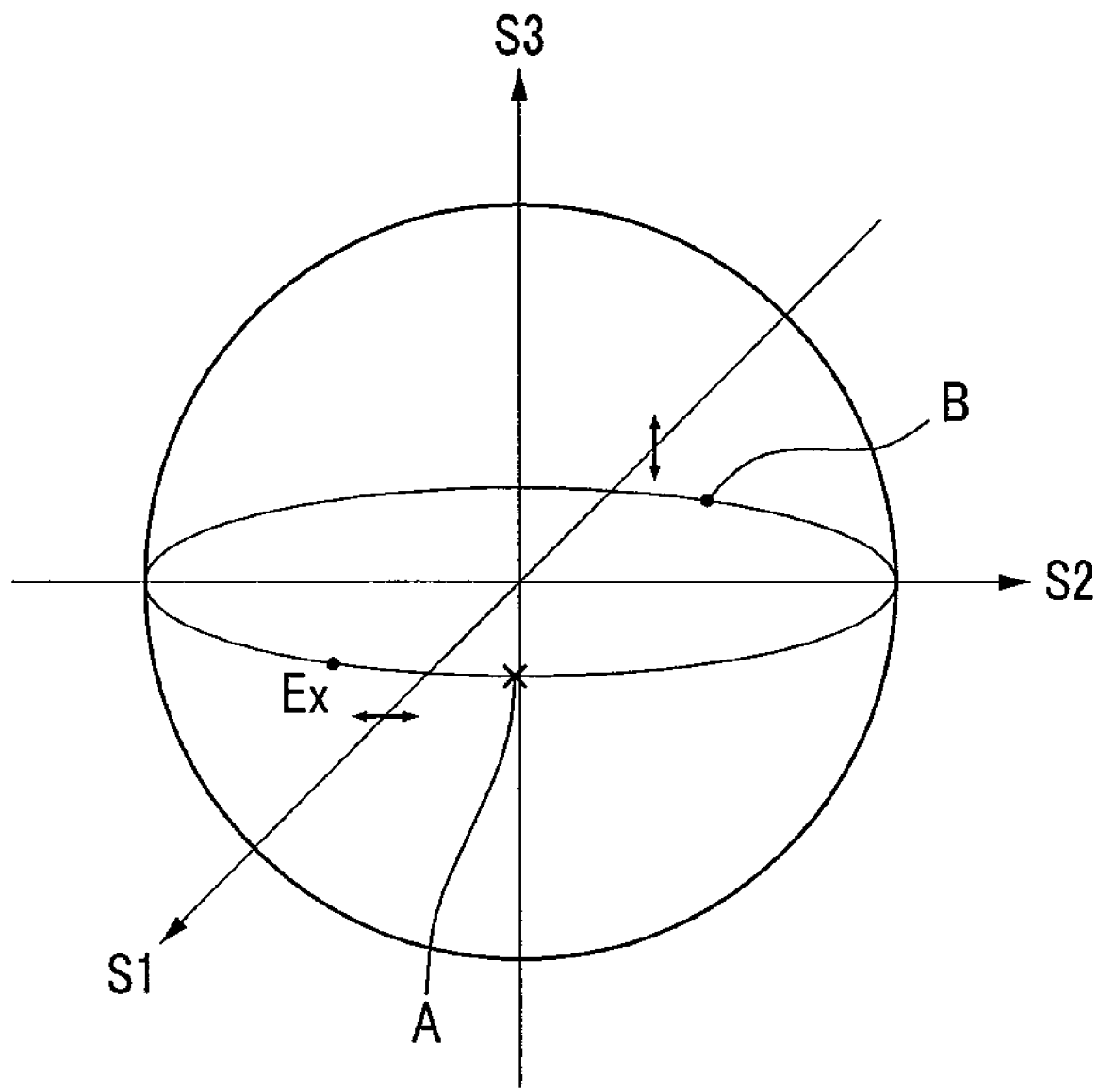
FIGS. 3 and 4 are Poincare sphere color coordinates showing a polarization state in an exemplary embodiment of a liquid crystal display.
Figure 4:
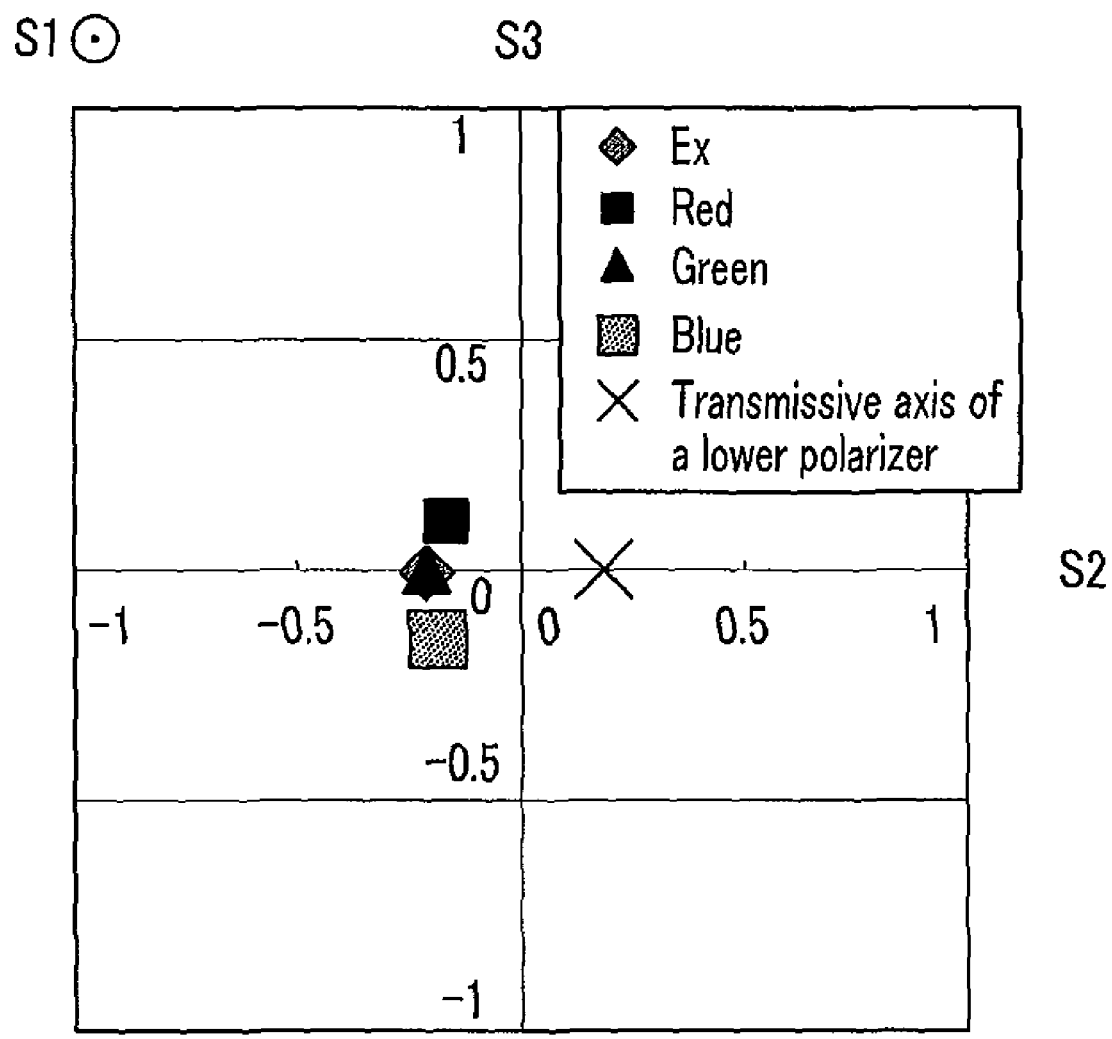

FIG. 3 and FIG. 4 illustrate a polarization state wherein an embodiment of a liquid crystal display is seen in a direction from an azimuthal angle of 45 degrees and a polar angle of 60 degrees FIGS. 3 and 4 are Poincare sphere color coordinates showing a polarization state in an exemplary embodiment of a liquid crystal display.

In the Poincare sphere color coordinates of FIG. 3, the three rectangular coordinates represent the different polarization states of light, and the S1-S2 plane represents linear polarization.

The position of the point A or the point X of FIG. 3 and FIG. 4 represents the polarization state of light that has passed through the lower polarizer 12, that is, the polarization state of the transmissive axis of the lower polarizer 12, and the point B of FIG. 3 represents the polarization state of the transmissive axis of the upper polarizer 2. In FIG. 4, the polarization states of the transmissive axes of the lower and upper polarizers 12 and 22 are the same as the point X.

To display black in the present exemplary embodiment, the polarization state of red R, green G, and blue B light that have passed through the lower polarizer 12, the lower compensation film 14, the lower panel 100, the liquid crystal layer 3, and then the upper compensation film 24 should reach the extinction point Ex of FIG. 3 and FIG. 4 so that the polarization direction is perpendicular to the polarization direction B of the transmissive axis of the upper polarizer 22, thereby preventing light leakage and increasing the contrast ratio.

According to the present exemplary embodiment, the polarization states of the primary colors of red R, green G, and blue B approach the extinction point Ex, as shown in FIG. 4. Accordingly, the luminance at the side in a black state is lower than a side luminance of a liquid crystal display according to other art, and the luminance of a specific color is also decreased. In this way, light leakage may be prevented or reduced at the side, and the contrast ratio may be increased.

Figure 5:
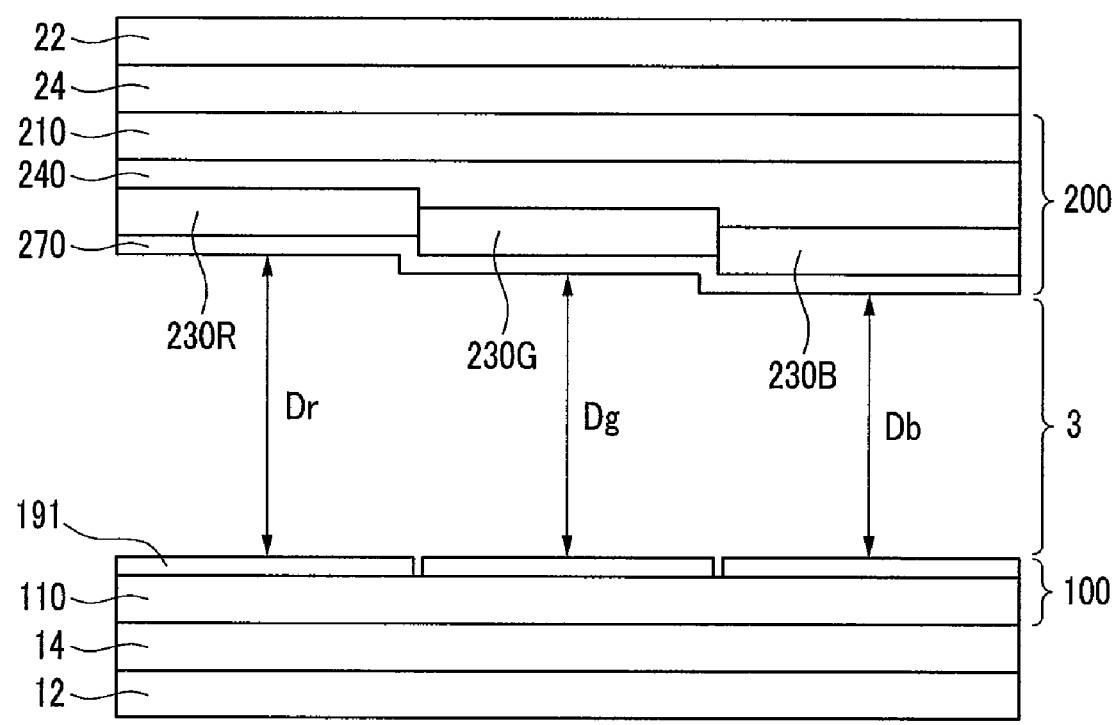
FIG. 5 to FIG. 9 are schematic cross-sectional views of various exemplary embodiments of liquid crystal displays.
Figure 6:
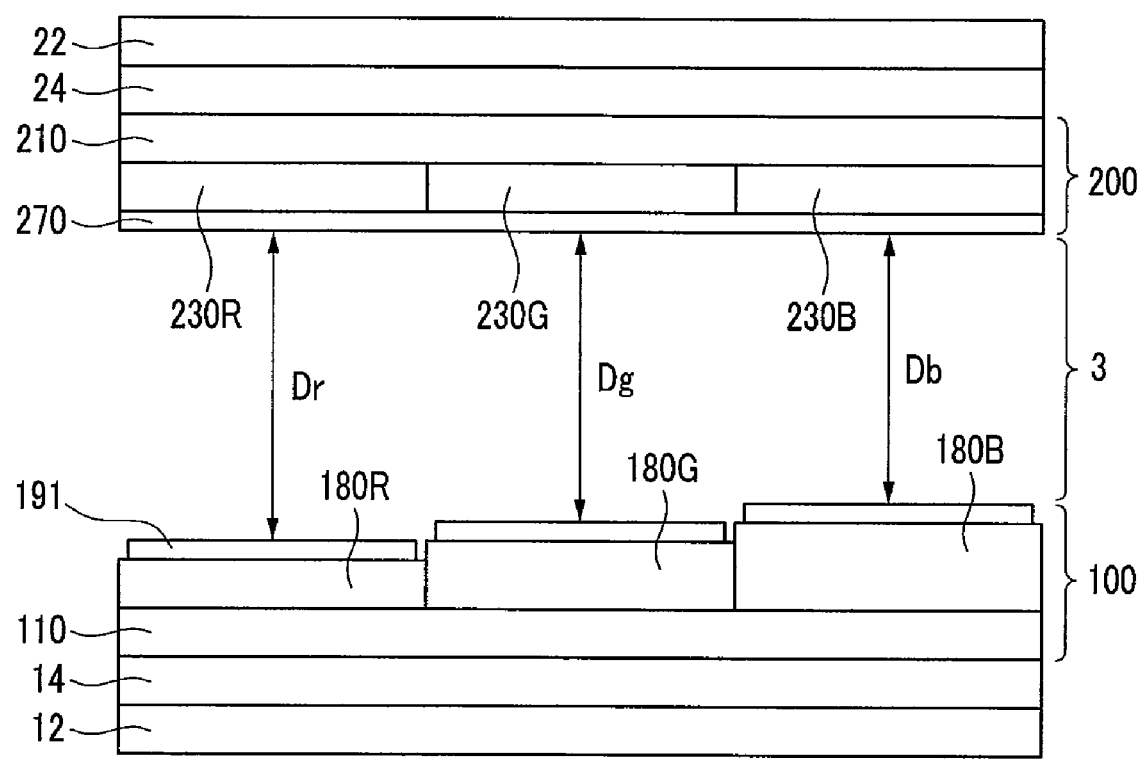
Figure 7:
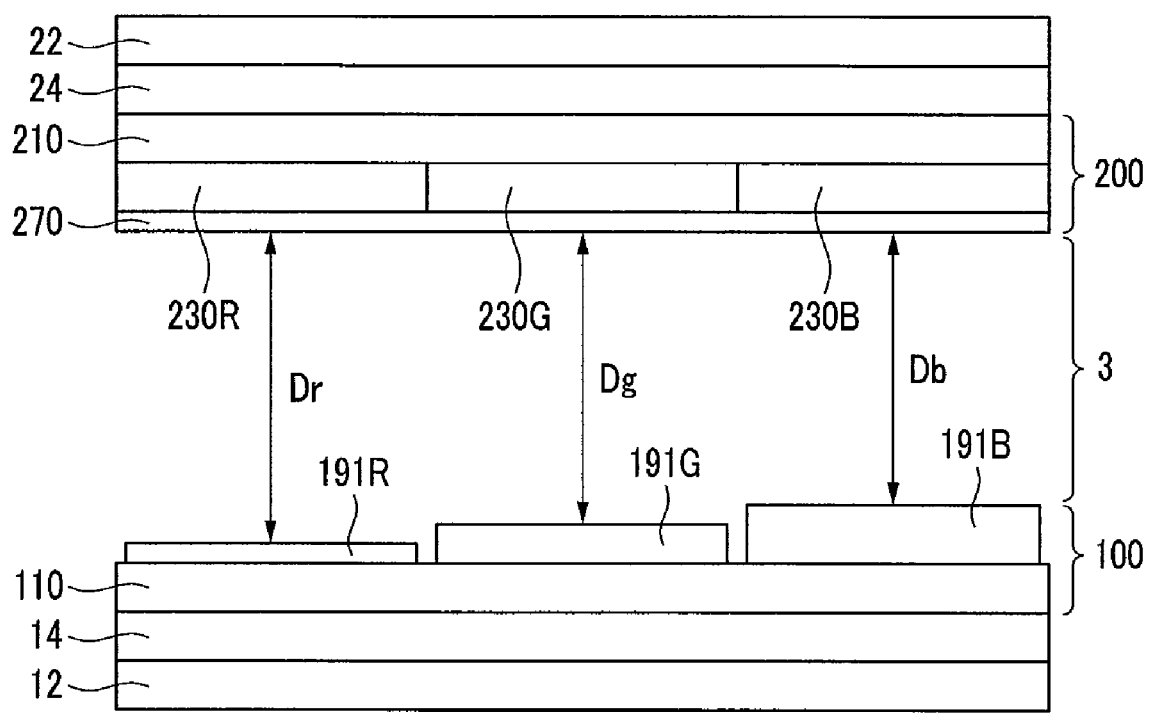

FIG. 5 to FIG. 7 illustrate cross-sectional views schematically showing various exemplary embodiments of liquid crystal displays.

FIG. 5 illustrates an exemplary embodiment of a layered structure of a liquid crystal display which is similar to the layered structure of the liquid crystal display shown in FIG. 2. Hereafter, different characteristics from the previous exemplary embodiment will be mainly described.

Referring to FIG. 5, an exemplary embodiment of a liquid crystal panel assembly may include a lower panel 100 and an upper panel 200 facing each other, and a liquid crystal layer 3 interposed therebetween.

First, referring to the lower panel 100, a plurality of pixel electrodes 191 are formed on the lower substrate 110. A plurality of switching elements (not shown) may be formed between the lower substrate 110 and the pixel electrodes 191, and a passivation layer (not shown) may be further added between the switching elements (not shown) and the pixel electrodes 191.

Next, referring to the upper panel 100, an insulating layer 240 that may be made of an inorganic insulator such as silicon nitride (SiNx) or silicon oxide (SiOx) is formed on the upper substrate 210, and a plurality of red color filters 230R, green color filters 230G, and blue color filters 230B are formed thereon.

The thickness of the insulating layer 240 may become greater gradually according the sequence corresponding to the red color filter 230R, the green color filter 230G and the blue color filter 230B. The insulating layer 240 may be formed by using one mask.

A common electrode 270 may be formed on the color filters 230R, 230G, and 230B.

The liquid crystal layer 3 interposed between the lower panel 100 and the upper panel 200 may include liquid crystal molecules 31 having negative or positive dielectric anisotropy, and the long axes of the liquid crystal molecules may be arranged perpendicular to the display panels 100 and 200 in the absence of an electric field.

In the present example embodiment, the cell gaps Dr, Dg, and Db of the liquid crystal layer 3 are different according to the positions of the color filters 230R, 230G, and 230B due to the insulating layer 240 having different thicknesses according to the positions of the color filters 230R, 230G, and 230B. On the other hand, the cell gaps Dr, Dg, and Db may satisfy $0 \mu m \leq Dg-Db$ and $Dr-Dg \leq 0.5 \mu m$.

Lower and upper compensation films 14 and 24 and lower and upper polarizers 12 and 22 are sequentially provided on the outer surface of the lower substrate 110 and the upper substrate 210, respectively. The lower and upper polarizers 12 and 22 may include a supporter (not shown) to protect the polarizers 12 and 22.

Like the previous exemplary embodiment, in the present exemplary embodiment, the cell gap D of the liquid crystal layer 3 is different according the positions of the color filters 230R, 230G, and 230B so that the relationship as in the Equation 8 is satisfied, and thereby light leakage may be prevented or reduced at the side, and the contrast ratio may be increased.

Alternatively, the insulating layer 240 may be disposed between the color filters 230R, 230G, and 230B and the common electrode 270 or on the lower panel 110.

According to an exemplary embodiment shown in FIG. 6, unlike FIG. 5, passivation layers 180R, 180G, and 180B having different thicknesses depending on the positions are formed on the lower substrate 110.

The thicknesses of the passivation layers 180R, 180G, and 180B of the lower panel 100 differ according to their positions corresponding to the color filters 230R, 230G, and 230B, and the thicknesses of the passivation layers 180R, 180G, and 180B increase in that order corresponding to the red color filter 230R, the green color filter 230G, and the blue color filter 230B. The passivation layers 180R, 180G, and 180B may be formed by using different masks.

According to the varying thicknesses of the passivation layers 180R, 180G, and 180B, the liquid crystal layer 3 disposed on the red color filter 230R, the green color filter 230G, and the blue color filter 230B has sequentially decreasing cell gaps Dr, Dg, and Db. On the other hand, the cell gaps Dr, Dg, and Db may satisfy $0 \mu m \leq Dg-Db$ and $Dr-Dg \leq 0.5 \mu m$.

Like the previous exemplary embodiment, the cell gap D of the liquid crystal layer 3 is different according to the positions of the color filters 230R, 230G, and 230B such that the relationship as in the Equation 8 is satisfied.

According to an exemplary embodiment shown in FIG. 7, the cell gaps Dr, Dg, and Db of the liquid crystal layer 3 are different from each other due to the pixel electrodes 191R, 191G, and 191B having different thicknesses depending on the positions of the color filters 230R, 230G, and 230B.

That is, the cell gaps Dr, Dg, and Db of the liquid crystal layer 3 disposed on the red color filter 230R, the green color filter 230G, and the blue color filter 230B are sequentially decreased. On the other hand, the cell gaps Dr, Dg, and Db may satisfy $0 \mu m \leq Dg-Db$ and $Dr-Dg \leq 0.5 \mu m$.

Numerous advantages and effects of the liquid crystal display shown in FIG. 2 and numerous advantages and effects shown in FIG. 3 to FIG. 4 may also apply to the liquid crystal display shown in FIG. 5 to FIG. 7.

Figure 8:
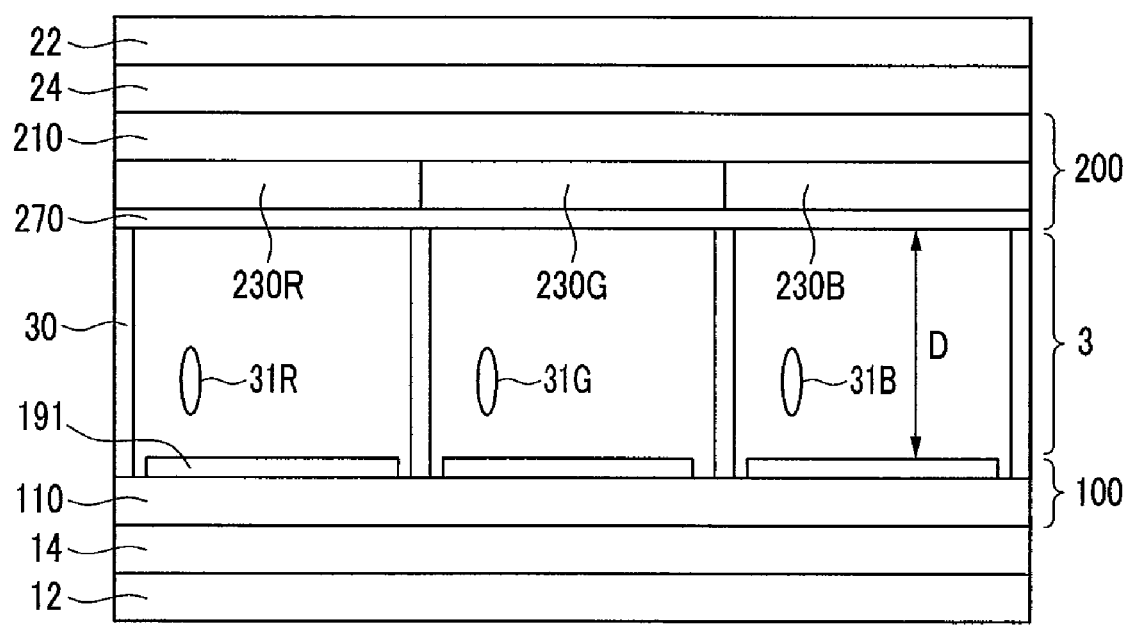

FIG. 8 illustrates a cross-sectional view of an exemplary embodiment of a liquid crystal display.

A layered structure of a liquid crystal display according to the present exemplary embodiment is similar to the layered structure of the liquid crystal display shown in FIG. 7. Hereafter, differences between the embodiment of FIG. 8 and the previous exemplary embodiment will be described.

According to the present exemplary embodiment, the thickness of the lower panel 100 including pixel electrodes 191 and the thickness of the upper panel 200 are substantially uniform regardless of the position of the color filters 230R, 230G, and 230B, unlike the liquid crystal display in FIG. 7.

However, the liquid crystal layer 3 disposed on each of the color filters 230R, 230G, and 230B includes different liquid crystal molecules 31R, 31G, and 31B, and the liquid crystal layer 3 is divided by a partition 30.

The partition 30 may be made of a polymer formed by irradiating light or heat to a hardening monomer.

The liquid crystal molecules 31R, 31G, and 31B have different refractive indexes Nxl, Nyl, and Nzl from each other such that the phase retardation values Rthl in the divided liquid crystal layers 3 are different according to the positions of the liquid crystal molecules, even though the cell gap D of the liquid crystal layer 3 is uniform. Accordingly, different refractive indexes Nxl, Nyl, Nzl are inserted to the Equation 2 instead of different cell gaps D so that different phase retardation values Rthl may be provided for the divided liquid crystal layers 3, and accordingly, Equation 8 may be satisfied.

Figure 9:
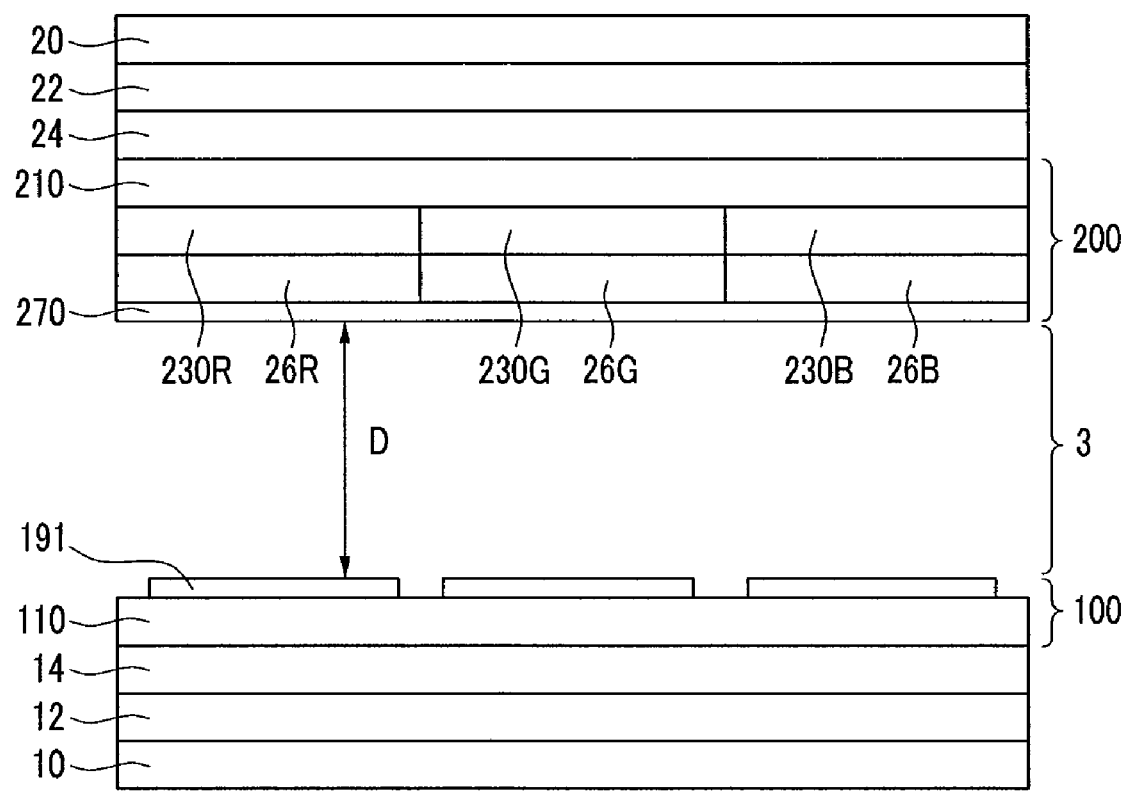

FIG. 9 illustrates a cross-sectional view of an exemplary embodiment of a liquid crystal display.

The layered structure of a liquid crystal display according to the present exemplary embodiment is similar to the layered structure of the liquid crystal display shown in FIG. 7. Hereafter, different characteristics from the previous exemplary embodiment will be mainly described.

According to the present exemplary embodiment, the thickness of the lower panel 100, including pixel electrodes 191 and the upper panel 200, are substantially uniform regardless of the position of the color filters 230R, 230G, and 230B, unlike the exemplary embodiment shown in FIG. 7. However, a plurality of phase retardation layers 26R, 26G, and 26B are further formed between the color filters 230R, 230G, and 230B and the common electrode 270.

Thus, in the present exemplary embodiment, instead of varying the cell gap D of the liquid crystal layer 3 or the refractive indexes Nxl, Nyl, and Nzl of the liquid crystal layer 3 according to the positions of the color filters 230R, 230G, and 230B, phase retardation layers 26R, 26G, and 26B, having different phase retardation values Rthp_r, Rthp_g, and Rthp_b according to the wavelengths λr, λg, and λb of red R, green G, and blue B, are provided on the respective color filters 230R, 230G, and 230B, thereby satisfying Equation 9 as follows.

$$0.21 \leq \frac{Rthl\_r + Rthp\_r - Rth\_r}{\lambda r} = \frac{Rthl\_g + Rthp\_g - Rth\_g}{\lambda g} = \frac{Rthl\_b + Rthp\_b - Rth\_b}{\lambda b} \leq 0.24 \quad \text{(Equation 9)}$$

Accordingly, like the previous exemplary embodiments, light leakage may be prevented or reduced at the side so that the contrast ratio may be increased.

Unlike the present exemplary embodiment, the phase retardation layers 26R, 26G, and 26B may be disposed between the upper substrate 210 and the color filters 230R, 230G, and 230B, on the outer surface of the upper panel 200, or on the lower panel 100.

Meanwhile, instead of forming the phase retardation layers 26R, 26G, and 26B as shown in FIG. 9, the color filters 230R, 230G, and 230B may have the same phase retardation values in the thickness direction as the phase retardation values Rthp_r, Rthp_g, and Rthp_b in the thickness direction of the phase retardation layer 26R, 26G, and 26B, thereby satisfying the Equation 9. In this case, Equation 10 may be satisfied.

$$0.21 \leq \frac{Rthl\_r + Rthc\_r - Rth\_r}{\lambda r} = \frac{Rthl\_g + Rthc\_g - Rth\_g}{\lambda g} = \frac{Rthl\_b + Rthc\_b - Rth\_b}{\lambda b} \leq 0.24 \quad \text{(Equation 10)}$$

Here, Rthc_r, Rthc_g, and Rthc_b are the phase retardation values Rthc in the thickness direction of the respective color filters 230R, 230G, and 230B according to the wavelengths λr, λg, and λb.

Next, a method for forming the color filters 230R, 230G, and 230B having different phase retardation values Rthc is described.

A photosensitive film for color filters may include a pigment dispersion solution and a photoresist. The pigment dispersion solution includes a pigment, a dispersion agent, and pigment derivatives, and the photoresist includes a binder, a monomer, and an initiator. Phase retardation is generated when a thin film of the pigment derivatives is formed and crystallized, wherein color filters 230R, 230G, and 230B, having different phase retardation values Rthc_r, Rthc_g, Rthc_b, may be formed by controlling the degree of the crystallization of the pigment derivatives.

Unlike the above-described exemplary embodiments, the pixel electrodes 191 and the common electrode 270 may be formed on the same substrate 110 or 220. In this case, when the liquid crystal display displays black with appropriate characteristics of the dielectric anisotropy of the liquid crystal molecules 31 and the arrangement of the transmissive axes of the polarizers 12 and 22, the long axes of the liquid crystal molecules 31 may be perpendicular to the substrate 110 and 220. Accordingly, the numerous characteristics of the above exemplary embodiments may be applied in this case.

According to the embodiments of the present disclosure, light leakage in a side direction may be prevented or reduced and the contrast ratio in a side direction may be improved in the liquid crystal display.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
    a lower panel;
    an upper panel facing the lower panel and including a plurality of red color filters, green color filters, and blue color filters, the color filters having corresponding wavelengths λr, λg, and λb corresponding to red, green and blue, respectively;
    a liquid crystal layer interposed between the lower and upper panels;
    a first compensation film on an outer surface of the lower panel or the upper panel, wherein the first compensation film has phase retardation values Rth_r, Rth_g, and Rth_b in a thickness direction of the first compensation film and corresponding to the wavelengths of red, green, and blue, respectively;
    a lower polarizer disposed on the outer surface of the lower panel; and
    an upper polarizer on the outer surface of the upper panel, wherein the liquid crystal layer, the lower and upper polarizers and the lower and upper panels have phase retardation values RthL_r, RthL_g, and RthL_b in a thickness direction and corresponding to red, green, and blue wavelengths respectively;

wherein the wavelengths and phase retardation values satisfy the equation $$0.21 \le \frac{Rth\_r - Rthc\_r}{\lambda r} = \frac{Rth\_g - Rthc\_g}{\lambda g} = \frac{Rth\_b - Rthc\_b}{\lambda b} \le 0.24.$$

2. The liquid crystal display of claim 1,
wherein the liquid crystal layer has first, second and third cell-gap portions corresponding to the red, green and blue filters, respectively, the first, second and third cell-gap portions having cell gaps Dr, Dg and Db, respectively, and
wherein the cell gaps Dr, Dg and Db satisfy the equation 0 μm≦Dg−Db, and
Dr−Dg≦0.5 μm.

3. The liquid crystal display of claim 1, wherein
the liquid crystal layer includes liquid crystal molecules,
long axes of the liquid crystal molecules are arranged perpendicular to the lower and upper panels, and
transmissive axes of the lower and upper polarizers are perpendicular to each other.

4. The liquid crystal display of claim 1, wherein the first compensation film comprises a negative C-plate or a negative biaxial film.

5. The liquid crystal display of claim 4, further comprising a second compensation film disposed on the outer surface of the upper or lower panels facing the first compensation film.

6. The liquid crystal display of claim 5, wherein
the second compensation film comprise a positive A-plate.

7. The liquid crystal display of claim 1,
wherein the liquid crystal layer has phase retardation values Rthl_r, Rthl_g, and Rthl_b in a thickness direction of the liquid crystal layer and corresponding to the wavelengths λr, λg, and λb of red, green and blue, respectively;
wherein the phase retardation values and wavelengths satisfy the equation $$0.21 \le \frac{Rthl\_r - Rth\_r}{\lambda r} = \frac{Rthl\_g - Rth\_g}{\lambda g} = \frac{Rthl\_b - Rth\_b}{\lambda b} \le 0.24.$$

8. The liquid crystal display of claim 7, wherein
the liquid crystal layer has different cell gaps according to positions corresponding to the red, green, and blue color filters.

9. The liquid crystal display of claim 8, wherein
cell gaps of the liquid crystal layer corresponding to the red green and blue color filters decrease in that order.

10. The liquid crystal display of claim 8, wherein
thicknesses of the red, green and blue color filters are different from each other.

11. The liquid crystal display of claim 10, wherein
thicknesses of the red, green, and blue color filters increase going from the red to the green and to the blue color filters, in that order.

12. The liquid crystal display of claim 8, wherein
one of the lower panel or the upper panel further comprises an insulating layer, and
a thickness of the insulating layer differs according to positions corresponding to the red, green, and blue color filters.

13. The liquid crystal display of claim 12, wherein
the thickness of the insulating layer corresponding to the red, green, and blue color filters increases in that order.

14. The liquid crystal display of claim 8, wherein
the lower panel further comprises a pixel electrode, and
a thickness of the pixel electrode differs according to positions corresponding to the red, green, and blue color filters.

15. The liquid crystal display of claim 14, wherein
the thickness of the pixel electrode corresponding to the red, green, and blue color filters increase in that order.

16. The liquid crystal display of claim 7, wherein
the liquid crystal layer comprises different liquid crystal molecules according to positions corresponding to the red, green, and blue color filters.

17. The liquid crystal display of claim 16, wherein
the liquid crystal layer is divided by a partition.

18. The liquid crystal display of claim 1,
wherein one of the lower or upper panel further comprises a phase retardation layer, the phase retardation layer having phase retardation values Rthp_r, Rthp_g, and Rthp_b, in a thickness direction of the phase retardation layer and corresponding to the wavelengths of red, green, and blue, respectively,
the liquid crystal layer has phase retardation values Rthl_r, Rthl_g, and Rthl_b in a thickness direction of the liquid crystal layer and corresponding to the wavelengths λr, λg, and λb of red, green, and blue, respectively, and
the wavelengths and phase retardation values of the liquid crystal layer, the first compensation film, and the phase retardation layer satisfy the equation $$0.21 \le \frac{Rthl\_r + Rthp\_r - Rth\_r}{\lambda r} = \frac{Rthl\_g + Rthp\_g - Rth\_g}{\lambda g} = \frac{Rthl\_b + Rthp\_g - Rth\_b}{\lambda b} \le 0.24.$$

19. The liquid crystal display of claim 18, wherein
the first compensation film comprises a negative C-plate or a negative biaxial film.

20. The liquid crystal display of claim 19, further comprising
a second compensation film disposed on the outer surface of the upper or lower panels facing the first compensation film.

21. The liquid crystal display of claim 20, wherein
the second compensation film comprises a positive A-plate.

22. The liquid crystal display of claim 18, wherein
the liquid crystal layer comprises liquid crystal molecules,
long axes of the liquid crystal molecules are arranged perpendicular to the lower and upper panels, and
transmissive axes of the lower and upper polarizers are perpendicular to each other.

23. The liquid crystal display of claim 1,
wherein the red, green, and blue color filters in a thickness direction of the red, green, and blue color filters have a phase retardation values Rthc_r, Rthc_g, and Rthc_b, in a thickness direction of the red, green, and blue color filters and corresponding to the wavelengths λr, λg, and λb of red, green, and blue, respectively,
the liquid crystal layer has phase retardation values Rthl_r, Rthl_g, and Rthl_b in a thickness direction of the liquid crystal layer and corresponding to the wavelengths λr, λg, and λb of red, green, and blue, respectively, and wherein the wavelengths and the phase retardation values satisfy the equation $$0.21 \leq \frac{Rthl\_r + Rthc\_r - Rth\_r}{\lambda r} = \frac{Rthl\_g + Rthc\_g - Rth\_g}{\lambda g} = \frac{Rthl\_b + Rthc\_g - Rth\_b}{\lambda b} \leq 0.24.$$

24. The liquid crystal display of claim 23, wherein the first compensation film comprises a negative C-plate or a negative biaxial film.

25. The liquid crystal display of claim 24, wherein a second compensation film is further disposed on the outer surface of the upper or lower panels facing the first compensation film.

26. The liquid crystal display of claim 25, wherein the second compensation film comprises a positive A-plate.

27. The liquid crystal display of claim 23, wherein the liquid crystal layer comprises liquid crystal molecules, long axes of the liquid crystal molecules are arranged perpendicular to the lower and upper panels, and transmissive axes of the lower and upper polarizers are perpendicular to each other.

* * * * *